Aug. 1, 1967  J. A. BENDER  3,333,964
DRIP INFUSION BREW MAKER
Filed Dec. 14, 1964  3 Sheets-Sheet 2
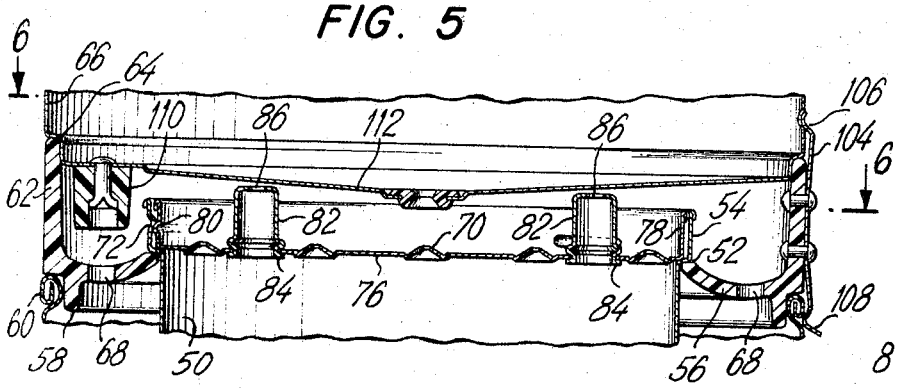
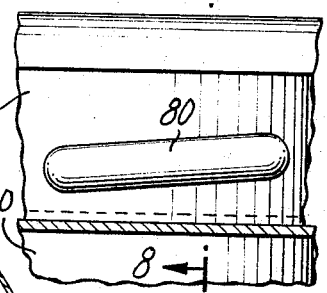
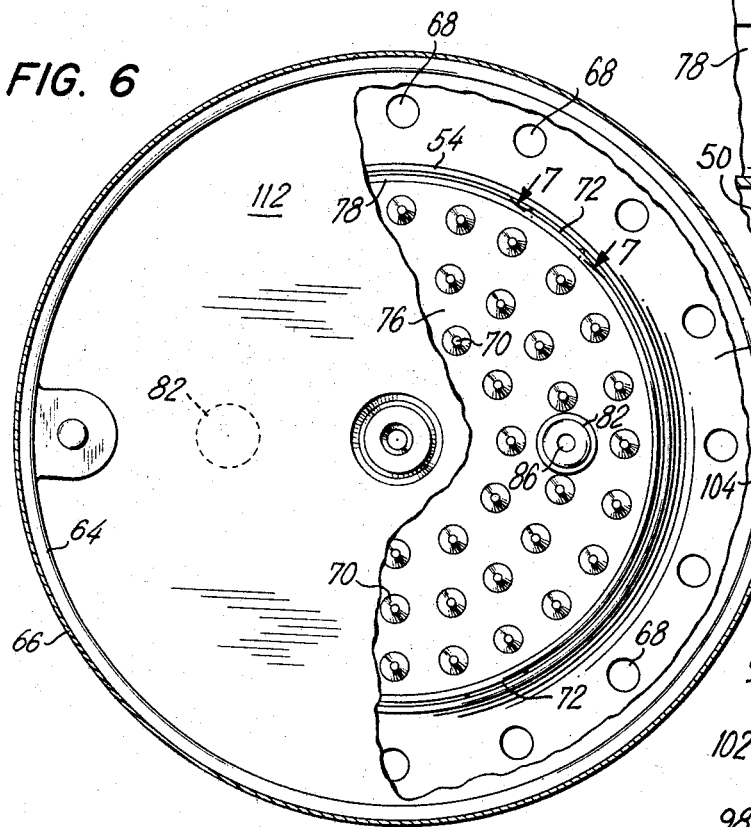
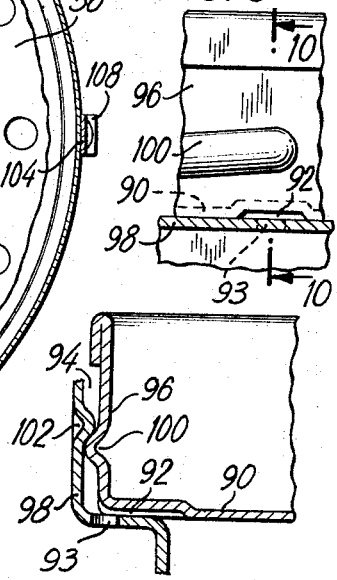
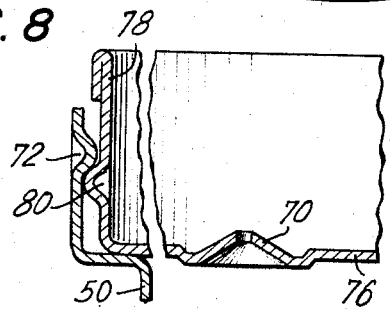
INVENTOR
JOSEPH A. BENDER
BY
James and Franklin
ATTORNEYS

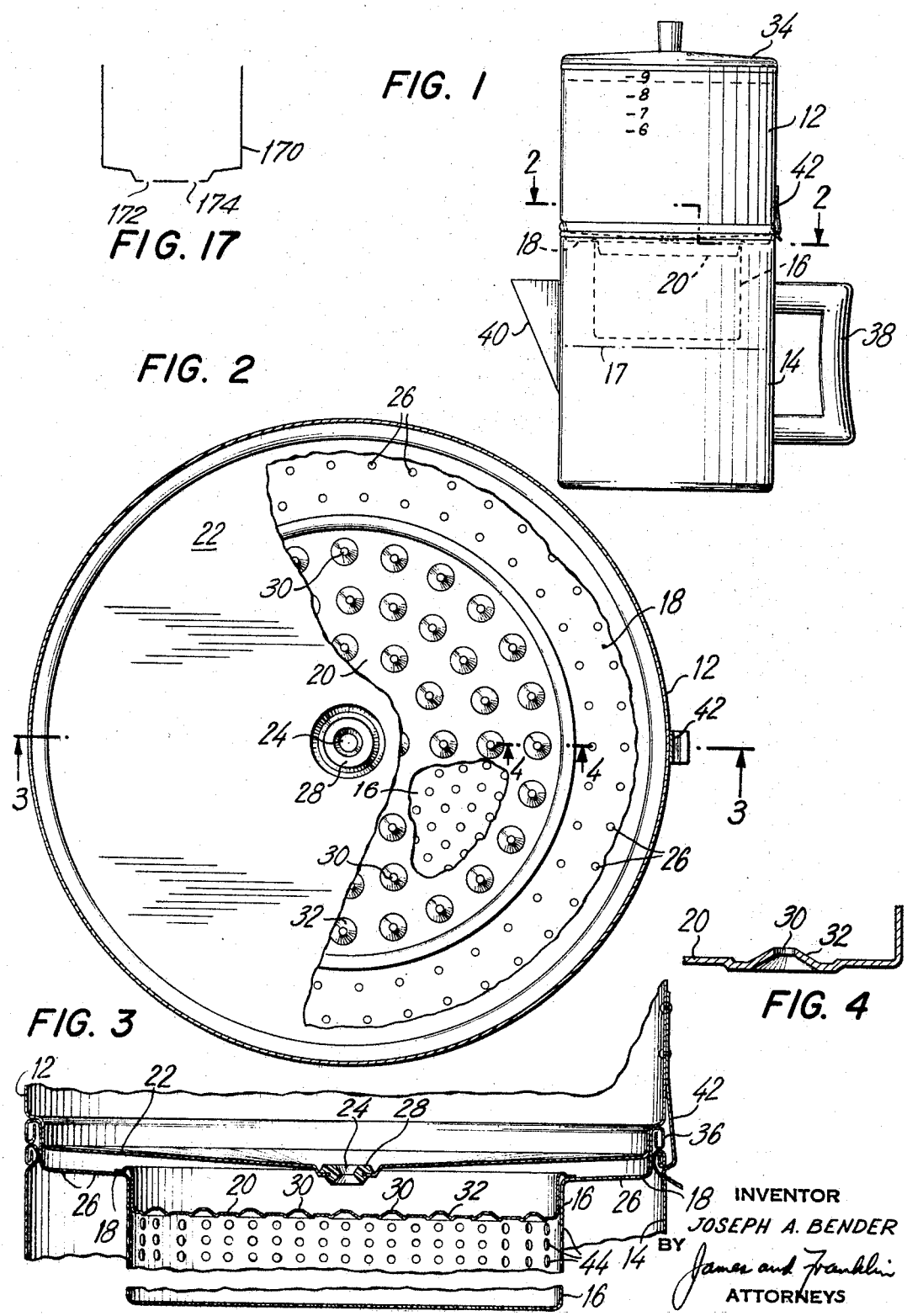

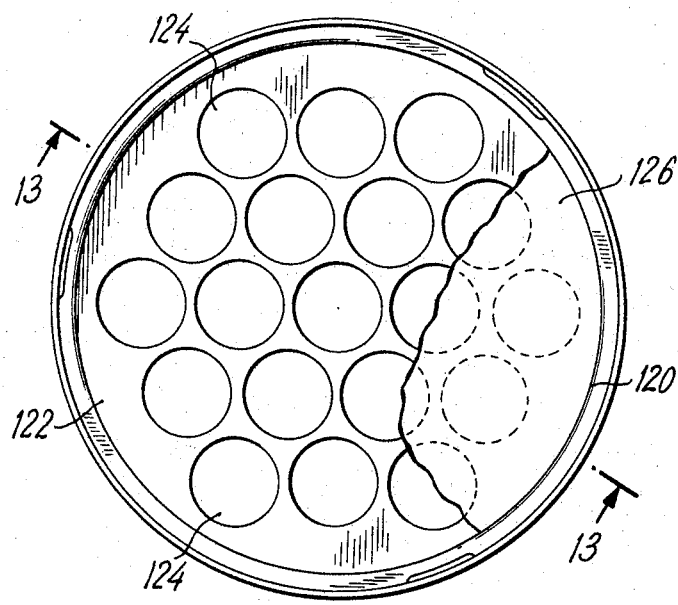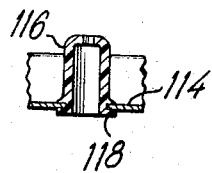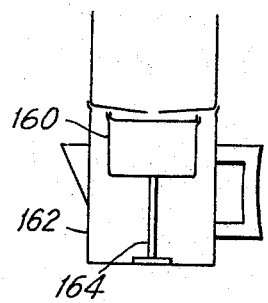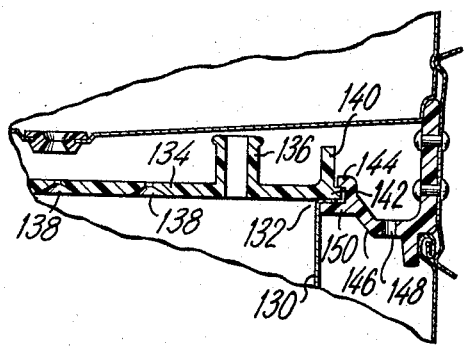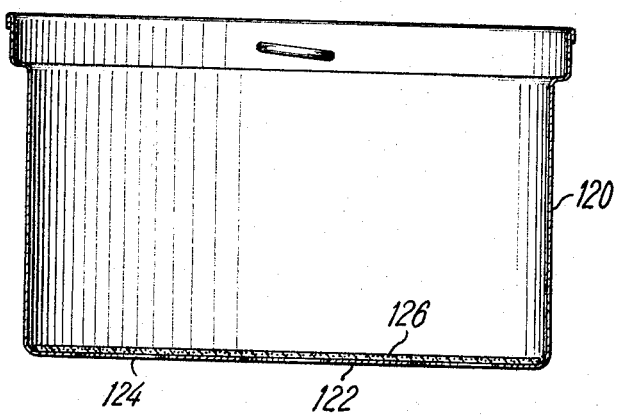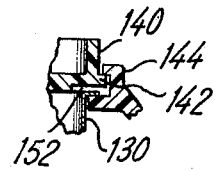

3,333,964
DRIP INFUSION BREW MAKER
Joseph A. Bender, Springfield, N.J., assignor to Vacuum Die Casting Corp., Newark, N.J., a corporation of Ohio
Filed Dec. 14, 1964, Ser. No. 418,210
13 Claims. (Cl. 99—71)

This invention relates to brew makers, and more particularly to coffee makers of the drip type.

Experts in the art of brewing coffee, among them the scientists of The Coffee Brewing Institute, Inc., located in New York city, N.Y., emphasize that the best quality coffee is obtained by proper proportion between coffee and water; correct water temperature; and correct brewing time.

The temperature of the water in contact with the grounds should be between 185° to 203°. The best brewing time is a function of the fineness of the coffee grounds, rather than the quantity of the brew. During the initial brewing period, most of the desirable elements are extracted from the coffee grounds, but once this initial period has elapsed, the extraction of desirable elements diminishes rapidly, and from that point on mostly undesirable bitter elements are transferred to the brew. The Coffee Brewing Institute, Inc., has established the following optimum brewing times for the various grinds of coffee: fine grind, 1 to 3 minutes; drip grind, 4 to 6 minutes; and regular grind, 6 to 8 minutes.

I consider drip coffee makers to be best, for practical control of the above factors, and the general object of this invention is to provide a coffee brewing process whereby the basic rules of good brewing practice are adhered to, and the variables that are inherent in existing equipment are minimized.

In accordance with more specific objects, my improvement provides that the flow rate from the reservoir be independent of the flow rate through the coffee bed; that the water admitted to the coffee basket be distributed to avoid channeling; that the spreader confine the coffee grounds to prevent floating particles from entering the finished brew; and that means be provided to permit any water which is not capable of going through the spreader and basket to be by-passed directly to the brew receiver.

Considering these objectives more closely, for optimum distribution I provide a spreader over the coffee bed. This distributes the water evenly, and restrains grounds which have floated to the surface from overflowing into the receiver. A rim is turned up around the spreader in which water collects to provide a slight pressure head. The water has to pass through a large number of dimples shaped like miniature inverted funnels. The surface tension of the water is instrumental in forming drops on the underside of the inverted funnels, thus aiding flow. The size of the holes is determined by the coffee particle size to be restrained. The number of holes is made sufficient for the initial flow received from the reservoir at the start of the cycle, with minimum water load.

It is desirable to limit the physical size of the coffee basket in order to conserve space, and even more important to minimize the time required to drain the residual liquid from the basket after the flow from the reservoir has stopped, this being a variable that affects the total brewing time. I find that the volume of the basket should be from 1.6 to 2.5 times the volume of the maximum dry coffee charge, in which case the main drainage of the basket residual takes place within 30 seconds after flow from the reservoir has stopped, when using untreated water of normal hardness. (This may increase to a maximum of one and a half minutes when using softened water wherein the calcium ions have been temporarily replaced by sodium ions and there is a high concentration of sodium chloride and sodium bicarbonate, as is common in the southwestern and western portions of the U.S.) There is additional drip time, discussed later.

It has been found desirable to flood the coffee bed with hot water during at least part of the brewing cycle, but the buoyant mass of wet coffee grounds may rise to the underside of the spreader and tend to lift it up. Coffee grounds then may overflow and pass into the finished brew. A further object is to prevent this, which is done by locking together the spreader and basket.

Because some of the hot water supplied may not be accepted by the basket, another object is to provide means to bypass the excess water. I find that such bypassing in no way affects the quality or aroma of the brew. The amount of water which bypasses the basket is a function of the relationship between the rate of flow from the reservoir to the spreader, and the rate of flow through the coffee bed and filter. The filtering effect of the coffee bed presents the major resistance to flow. The rate of flow through the bed is affected by the depth of the bed, the head of water in the basket, and to a great extent by the chemical composition of water and the amount of sodium ions present as a result of water softening processes. The character of the water can affect the brewing time as much as 100% in an ordinary drip coffee maker not having my improvements. (Ref. Coffee Brewing Institute Publication No. 31.)

During the initial period of contact between the water and the coffee, gases are released from the grounds. A further object is to allow these gases to escape, and also to prevent the basket from becoming air locked as the water rushes in. I therefore provide means to vent the spreader-and-basket assembly.

The appliance consists of three main parts, namely a source or a reservoir supplying hot water, a spreader of proper design to distribute the water issuing from the source combined with a basket containing ground coffee, and a server to receive the finished brew. In accordance with the above features and objects of the invention, means are provided for controlling the flow of hot water from the reservoir so that the timing of the brewing cycle is correct for the grind used. The controlled flow is determined for brewing time, and is independent of the ability of the spreader and basket to accept all of the water. The coffee bed is flooded for at least part of the brewing cycle. At the same time, measures are taken to prevent air lock in the basket, and to allow excess water to bypass the basket without carrying grounds into the finished brew.

In all cases, optimum timing of the brewing cycle is assured by controlling the flow of hot water to the spreader. The water is delivered through a reservoir discharge orifice within the desired brewing time. The flow time through the orifice takes into account the time required for drainage of the basket after the flow from the reservoir has stopped.

The spreader design preferred for this application distributes the water in the form of droplets. This is a distinct improvement over the conventional drip coffee maker where a number of very fine holes are made directly in the bottom of the reservoir. Such holes are subject to scaling, with subsequent change in flow rate. More importantly, there is a tendency for channeling of the water through a coffe bed, and consequently the wetting of the coffee may be insufficient for proper extraction.

To accomplish the foregoing general objects, and other more specific objects which will hereinafter appear, my invention resides in the drip coffee maker elements and their relation one to another, as are hereinafter more particularly described in the following specification. The specification is accompanied by drawings in which:

FIG. 1 is an elevation of a drip coffee maker combining features of the invention;

FIG. 2 is a stepped horizontal section taken approximately on the line 2—2 of FIG. 1;

FIG. 3 is a fragmentary vertical section taken on the line 3—3 of FIG. 2;

FIG. 4 is a fragmentary section through a hole in the spreader, drawn to enlarged scale, and taken on the line 4—4 of FIG. 2;

FIG. 5 is a fragmentary vertical section like that of FIG. 3, but showing a modification;

FIG. 6 is a horizontal section taken approximately on the stepped line 6—6 of FIG. 5;

FIG. 7 is a fragmentary view drawn to enlarged scale and taken at the line 7—7 of FIG. 6;

FIG. 8 is a fragmentary section taken on the line 8—8 of FIG. 7;

FIG. 9 is a fragmentary view like FIG. 7, but showing a modification in which the basket has a side vent;

FIG. 10 is a fragmentary section taken on the line 10—10 of FIG. 9;

FIG. 11 is a fragmentary vertical section showing a modified top vent;

FIG. 12 is a plan view of another type of basket which may be used with the present improvement;

FIG. 13 is a section taken approximately on the line 13—13 of FIG. 12;

FIG. 14 is a fragmentary vertical section corresponding to the right portion of FIG. 5 but showing a modification;

FIG. 15 is a fragmentary view of a further modification generally like that shown in FIG. 14, but using a side vent;

FIG. 16 shows another basket support; and

FGI. 17 shows multiple flow control holes.

Referring to the drawing, and more particularly to FIG. 1, the coffee maker comprises a source 12 of hot water, a coffee server 14 therebeneath, and a coffee basket 16 between the source 12 and the server 14. The basket 16 is supported by an annular support 18 which is outside the periphery of the basket, and this annular support has overflow holes for overflow outside the basket 16 to the server 14. There is also a spreader 20 in the basket. In the usual form here shown, the source 12 is a reservoir; the basket 16 is smaller in diameter than the server 14; and the annular support 18 extends between the periphery of the basket 16 and the periphery of the server 14.

Referring now to FIGS. 2 and 3, the reservoir 12 has a full bottom 22 except for means, in this case a flow discharge hole 24, affording a controlled flow to the spreader 20. The overflow holes in the annular support 18 are clearly shown at 26 in FIGS. 2 and 3.

In accordance with one feature of the invention, the water flow from the reservoir 12 is controlled to provide a discharge time for discharge of all of the water from the reservoir which time, when added to the residual basket drain time, comes within the range of optimum extraction time for the grind contemplated to be used, and regardless of any slower rate of flow through the basket. Indeed, the basket preferably is so dimensioned and designed in respect to its perforations or permeability that the coffee grounds are flooded. Any excess water collects above the spreader 20, and then bypasses the basket and the coffee therein by flow through the overflow holes 26 directly into the server 14. The latter when full has a level below the basket, as indicated at 17.

The operation involves to some extent the physical dimension of the basket, and for the present invention I find it desirable to provide a basket having a volume in a range from 1.6 to 2.0 times the dry volume of the maximum coffee charge contemplated to be used in the basket. This is for fine grind. For drip grind this desirably may be increased to say 2 to 2.5 times the dry volume, because of a tendency to sometimes foam. The grounds swell about 50% when wet. The entire range of 1.6 to 2.5 is usable for both grinds. The smaller basket aids compactness.

The present coffee maker is designed for a relatively fixed amount of brew, say from two-thirds full to full (e.g. four cups to six cups, or six cups to nine cups, or eight cups to twelve cups). The limited range of quantity is readily kept within the optimum extraction time, including an allowance for residual basket drain time. This drain time is itself a variable because of water softening, and because the amount of coffee put in the basket is varied with the quantity to be made.

The latter fact explains why the brew is not weakened by the bypass overflow. The percent solids extracted from the coffee is a function of time. There should be 18% to 22% by weight extraction from the coffee grounds. If under 18% the brew may be weak, and if over 22% the brew may be strong and bitter. When the quantity of hot water is to be increased, the amount of coffee grounds put in the basket is correspondingly increased by the housewife, and therefore the amount of solids extracted is commensurately increased, for the same extraction time. The bypass water therefore merely restores the originally desired percentage content of solids, which otherwise would be excessive. The percentage solids in the finished brew should be from 1.15% to 1.35%. (These percentages are given by The Coffee Brewing Institute, Inc.) I have been surprised to find that an overflow of as much as 75% does not prevent the correct and desired concentration of brew as here described.

The optimum extraction time is the extraction time needed to secure the desired 18% to 22% by weight of extraction from the coffee grounds. The flooding of the basket at the start of the brewing operation takes a little time, and the final slow drip from the basket at the end of the brewing operation takes considerable time, while accomplishing little extraction because the liquid level is even lower than the coffee level. The net result is that the total time for the present coffee maker may be about a minute longer than the time given by The Coffee Brewing Institute, Inc. More specifically, for fine grind the total time may be from two to four minutes, and for drip grind it may be from five to seven minutes.

It is primarily to facilitate control of the flow discharge rate of the hot water that it preferably is supplied through a single large aperture, as shown at 24. The use of a number of minute holes would introduce a variable because of scaling and clogging of such holes. Indeed, even with a single aperture, as shown at 24, it may be desired to guard against scaling and resulting reduction in dimension of the aperture, and for this purpose the opening may be defined by an eyelet-like bushing 28 made of a plastics material which is not subject to scaling. However, this is not necessary.

The use of a large aperture makes it important to use a spreader, as shown at 20, in order to ensure thorough distribution of the hot water through the coffee bed. The spreader is additionally desirable to confine any coffee grounds which might otherwise flow upward, outward, and downward through the overflow holes into the server. For this purpose, the holes 30 in the spreader preferably are small; and in such case it has been found desirable to provide the holes at the top of upward projections 32, one of which is shown to enlarged scale in FIG. 4. These projections resemble miniature inverted funnels, and it is known that surface tension therebeneath encourages formation of drops and free passage of water through small holes which, because of their small size, would otherwise inhibit flow. Back pressure inhibits the formation of drops and therefore venting is important.

Gases are generated or released from the coffee grounds by the extraction process. Free venting of such gases is inhibited or prevented when there is a body of fresh hot water overlying the spreader. Provision for venting is therefore made, and in the basket of FIG. 3 there is a narrow band of vent holes through the side wall near the top of the basket. In this example there are three lines of holes, indicated at 44. They permit free escape of gases despite the presence of a body of water over the spreader 20. One line would suffice.

Reverting to FIG. 1, the reservoir 12 may have the usual cover 34. The reservoir is made of sheet material, typically sheet aluminum. The basket 16 (FIG. 3) is formed integrally with the annular support 18, and the latter has a rolled support ledge 36, all of these parts being made integrally out of sheet metal, e.g. sheet aluminum. The server 14 (FIG. 1) likewise may be drawn sheet aluminum, and is provided with the usual heat insulating handle 38, and a pour spout 40. A spring detent 42 may be provided to help hold the parts in assembled relation during the brewing operation. When the hot brew has drained into the server, the reservoir 12 and the basket 16 are removed from the server, and the cover 34 then may be used as a cover for the server.

FIGS. 5 and 6 of the drawing show a modified coffee maker. One difference is that the annular support for the basket is separate from the basket, and may be made of a different material, preferably a molded plastics material. As here shown, the basket 50 is made of sheet metal and is outwardly stepped at 52, beneath a rim 54. The basket 50 is dimensioned to slide through a plastic support 56, with the shoulder 52 resting on the inner edge of the support. The outer bottom part of the support is shaped and dimensioned at 58 to fit over the rolled upper edge 60 of the coffee server, and the top rim 62 of the support is shaped and dimensioned to receive the stepped bottom part 64 of the reservoir 66. The annular support 56 has large overflow holes 68 clearly shown in FIGS. 5 and 6.

When using large overflow holes it is desirable to guard further against the possibility of outwardly floating coffee grounds. The water distribution holes 70 of the spreader are small enough to confine the grounds, but there remains the possibility of lifting of the entire spreader, and to prevent this the spreader may be locked against upward movement. For this purpose the basket and spreader are provided with mating detent projections. These may vary in form, but in the present case the rim 54 of the basket has a plurality, say three, sloping indents 72 (FIG. 8) providing an interrupted thread. The spreader 76 is upwardly flanged or cupped as before (as shown at 78), and the part 78 has a corresponding number (in this case three) outwardly struck sloping indents 80 (FIGS. 7 and 8). To assemble the parts, the spreader is oriented with interrupted thread 80 displaced from the interrupted thread 72, and is moved downward and rotated. The rotation of one part relative to the other tightens their engagement with a screw thread action.

Another difference is that there are no side holes through the basket wall 50 for venting. Instead top vents are employed through the spreader 76 (FIG. 5). These are shown at 82. They are inverted cup-like vents, with their lower edges secured to the spreader at 84, and with a vent hole 86 at the top. The vents are higher than the rim 78 of the spreader, so that water temporarily collected above the spreader will not interfere with the desired venting action. One or more vents 82 will suffice, and in the present case it is preferred to employ two vents which are diametrically located as shown, because they then serve an additional purpose in facilitating rotation of the spreader relative to the basket when assembling the parts as previously described.

The plastic support ring 56 may be provided with a resilient leaf spring 104, the upper end 106 of which acts as a detent to help hold the reservoir 66 in position, and the lower end 108 of which helps hold the ring in position on the server.

Another difference in the construction shown in FIG. 5, compared to that shown in FIG. 3, is the provision of a plurality, usually three, feet 110 beneath the bottom wall 112 of the reservoir. These feet provide a means on which the reservoir may be stably rested when removed from the assembly.

A different kind of vent is shown in FIGS. 9 and 10. In this case, the marginal part of the bottom of the spreader 90 is radially channeled, as shown at 92, thus providing a horizontal vent passage. The gases then flow upward in the clearance space at 94 between the rim portion 96 of the spreader and the peripheral portion 98 of the basket. There are a number of such radial vents. The height is kept small enough to prevent flow of the coffee particles. A drain hole 93 prevents a head of water which might resist venting.

As before, the spreader wall 96 has helical outward projections 100, and the peripheral wall 98 of the basket has oppositely projecting elements which may be either dots or helical projections 102. To assemble the parts, it is merely necessary to drop the spreader into the basket with the parts 100 and 102 displaced from one another, and to then rotate one relative to the other to tighten the same with a screw thread action. This construction incidentally assures ample venting clearance at 94 between the parts 96 and 98.

In FIG. 5 the top vents 82 are drawn sheet metal cups. They may instead be made of molded plastics material, and such a construction is shown in FIG. 11, in which spreader 114 is provided with a plastic vent 116, the lower end of which may be expanded or spun outward to lock the same in position (as shown at 118). Two such vents may be provided in diametrical relation, as previously described, to act as handles for rotation of the spreader.

As so far described, it has been assumed that the bottom of the basket is perforated with a large number of minute holes to act as its own filter. This is not essential, and instead a filter disc may be employed. Such a construction is shown in FIGS. 12 and 13, in which the metal basket 120 may be like that described in connection with FIG. 5 or FIG. 10, but differs in that the bottom wall 122 has large area holes 124. The bottom acts merely as a support for a filter paper disc 126, overlying the bottom 122 of the basket. A new filter paper disc is inserted each time coffee is to be brewed.

Still another form of the invention is shown in FIG. 14, which corresponds to the right-hand portion of FIG. 5. In this case, the basket 130 is made of sheet metal and terminates in an outwardly turned flange 132. The spreader 134 is molded out of a plastics material. It is integrally molded with one or more vent tubes 136. The spreader holes 138 are formed directly in the plastics material, and the material is thick enough to make possible the inverted funnel shape without upward projections. However, such upward projections, if desired, could be formed when molding the spreader.

The spreader has an upstanding rim 140, and a peripheral flange 142. This may be interrupted to provide locking detents which are received beneath interrupted overlying ledges 144. The annular support ring 146 has overflow holes 148 as before, and a circular support ledge 150 on which the flange 132 of the basket 130 rests. The basket and spreader are locked in position by the locking or detent relation shown at 142, 144.

In FIG. 14, the plastic spreader 134 is provided with top vents 136, but if desired a plastic spreader may be provided with radial vents, and such a construction is shown in FIG. 15 which corresponds generally to the construction shown in FIG. 14, except that the top vents are omitted and instead at intervals the bottom of the spreader near its periphery is provided with small radial vent passages 152. The height may be limited to ten or twenty thousandths of an inch or whatever may be needed to prevent passage of the intended coffee grind.

FIG. 16 shows how the coffee basket 160 may be supported for free overflow to the server 162 without the use of an annular support with holes as previously described. In this case the basket is supported by a center post or pedestal 164. Inasmuch as the basket 160 is smaller in diameter than the server 162, there is ample space for overflow around the basket.

FIG. 17 (on sheet one of the drawings) shows a reservoir 170 having a pair of flow control orifices 172 and 174. The two holes are so dimensioned that the total or simultaneous flow therethrough equals the desired rate of flow, as described above.

As a specific example of dimensions which may be used for practice of the present invention, assume a reservoir having a diameter of five and one-half inches, with a bottom flow control hole formed directly in sheet metal. The hole may be 0.136 inch in diameter, in which case six cups of water are discharged in three and one-half minutes, and nine cups are discharged in less than five minutes. It will be recalled that additional time is used to drain residual liquid in the basket, and that this drainage time under extreme adverse conditions of hard water may be increased. The spreader is provided with holes having a diameter of 0.039 inch, which is small enough to confine drip grind coffee; and it is provided with forty-five holes, which is sufficient to pass the initial flow received from the reservoir at the start of the cycle, with six cups of water in the reservoir. However, there may be many more holes, because the flow will anyway flood the grounds.

The above example is for drip grind coffee. When using fine grind coffee the flow control orifice may have a diameter of 0.220 inch. The reservoir is assumed to have the same diameter of 5½ inches. Nine cups flow from the reservoir in two minutes. Six cups flow from the reservoir in one minute and forty seconds. The spreader is assumed to be the same as that described above.

It will be understood that these dimensions are given solely by way of example, and are not intended to be in limitation of the invention.

It is believed that the construction and operation of my improved coffee maker, as well as the advantages thereof, will be understood from the foregoing detailed description. Hot water is supplied to a spreader at a controlled rate to provide a water discharge time which, when added to the residual basket drain time, comes within the range of optimum extraction time for the grind used in the basket, and regardless of any lower rate of flow through the basket. This causes the hot water to flood the coffee grounds, and even to overflow, with the excess hot water bypassing the basket and flowing directly to the server without contacting the coffee grounds. In the meantime, the coffee grounds are confined to the basket and are prevented from overflowing to the server. The resulting relatively uniform brewing time assures adequate extraction of coffee solids, without the prolonged brewing which would result in the extraction of undesirable bitter elements from the coffee.

The coffee maker here described is intended for a relatively fixed quantity of brew, say from two-thirds full to full. However, my improvement may be used with a wide range of quantity by the provision of multiple level flow from the reservoir, as is described in my copending application Ser. No. 418,175, filed on even date herewith.

The present coffee maker contemplates pouring a previously measured amount of hot water into the reservoir. To facilitate measurement of the quantity of hot water directly in the reservoir itself, the discharge hole (or multiple level discharge holes) may be stoppered by means of a manually operable valve element. In another form of the invention, I provide a valve which is automatically opened after a suitable delay adequate for pouring and measuring the desired quantity of hot water in the reservoir, and such a coffee maker is described in my application Ser. No. 418,211, filed on even date herewith.

If desired, the water may be electrically heated in the reservoir, instead of receiving previously heated water. The coffee maker then may be thermostatically controlled for fully automatic operation, while utilizing the features and advantages of the present improvement.

The coffee maker may be arranged for flow and overflow into a small-necked glass flask, such as is commonly used in commercial coffee makers intended for restaurant use.

In all cases the features of the present improvement are retained and utilized, and it therefore will be understood that while I have shown and described the invention in simple or basic form, changes may be made without departing from the scope of the invention, as sought to be defined in the following claims. In the claims the reference to a flow control discharge hole in the bottom of the reservoir is not intended to exclude the use of several holes as described above, nor the equivalent use of a syphon, for example, provided it establishes the desired flow rate.

I claim:

1. In the brewing of a beverage in a drip-type brew maker having a source of hot water, a basket with the infusion material therebeneath, a spreader over said infusion material, and a brew server to receive the brewed beverage, the method which includes flowing the hot water in a single direction and without recirculation to the spreader at a controlled rate to provide a water discharge time from the source which when added to the residual basket drain time comes within the range of optimum extraction time for the infusion material in the basket and regardless of any slower rate of flow through the basket, and thereby causing the hot water to flood the infusion material and to overflow, causing the overflowing excess hot water to bypass the infusion material in the basket and to flow directly to the server without contacting the said infusion material in the basket, and at the same time confining the infusion material to the basket to prevent overflow of floating infusion material to the server.

2. A drip brew maker comprising a source of hot water, a brew server, a basket for the infusion material between the source and the server, said basket having a perforate bottom, a support for said basket, a spreader to receive the flow of hot water from the source, said spreader having holes distributed over the infusion material in the basket, the said holes being small enough to confine the material in the basket but being numerous and thereby affording enough flow to thoroughly wet the material in the basket, said spreader acting as a top to prevent upward escape of the infusion material from the basket, means to define a hot water overflow level somewhat higher than the holes in the spreader, said basket and spreader and support combination providing means affording a relatively unrestricted rate of overflow of hot water from above the level of the holes in said spreader to the server without passing through the infusion material in the basket, said basket being readily separable from said source and from said server, said source having a flow rate control means serving to flow hot water onto the spreader at a desired rate, the said flow rate being controlled by said flow rate control means to provide a hot water discharge time from the source which when added to the residual basket drain time for the loaded basket comes within the range of optimum extraction time for the material contemplated to be used, and regardless of any slower rate of flow through the basket, the excess water then freely bypassing the infusion material in the basket by overflow.

3. A drip brew maker as defined in claim 2, in which the source of hot water is a hot water reservoir disposed above the brew server, with the spreader and basket being disposed therebetween, and in which the reservoir has a full bottom except for the flow rate control means providing the aforesaid controlled rate of flow to the spreader.

4. A drip brew maker as defined in claim 3, in which the basket is smaller in diameter than the server, and the combination of the basket and its support is so shaped and designed as to afford the desired relatively unrestricted overflow of hot water around the outside of the basket.

5. A drip brew maker as defined in claim 4, in which the basket support is an annular support between the periphery of the basket and the periphery of the server, and in which the annular support has large overflow holes for overflow of hot water outside the basket.

6. A drip brew maker as defined in claim 5, in which the spreader has an imperforate raised rim to define the said overflow level which is higher than the level of the holes in the spreader.

7. A drip brew maker as defined in claim 6, in which the spreader is provided with vents for the basket which vents are located at a level higher than the overflow level.

8. A drip brew maker as defined in claim 7, which is designed for the brewing of coffee, and in which the basket has a volume of 1.6 to 2.5 times the dry volume of the maximum coffee charge contemplated to be used in the basket.

9. A drip brew maker as defined in claim 2, in which the basket is smaller in diameter than the server, and the combination of the basket and its support is so shaped and designed as to afford the desired relatively unrestricted overflow of hot water around the outside of the basket.

10. A drip brew maker as defined in claim 2, in which the basket support is an annular support between the periphery of the basket and the periphery of the server, and in which the annular support has large overflow holes for the desired relatively unrestricted overflow of hot water outside the basket.

11. A drip brew maker as defined in claim 2, in which the spreader has an imperforate raised rim to define the said overflow level which is higher than the level of the holes in the spreader.

12. A drip brew maker as defined in claim 2, in which the spreader is provided with vents for the basket which vents are located at a higher level than the overflow level.

13. A drip brew maker as defined in claim 2, which is designed for the brewing of coffee, and in which the basket has a volume of 1.6 to 2.5 times the dry volume of the maximum coffee charge contemplated to be used in the basket.

References Cited

UNITED STATES PATENTS

| | | | |
|---|---|---|---|
| 1,276,774 | 8/1918 | Kuhn et al. | 99—311 |
| 1,601,987 | 10/1926 | Topper | 99—311 |
| 2,018,695 | 10/1935 | Wilcox | 99—306 |
| 2,143,046 | 1/1939 | Wilcox | 99—306 |
| 2,227,540 | 1/1941 | Fry | 99—306 |
| 2,245,389 | 6/1941 | Cremer | 99—306 |
| 3,174,424 | 3/1965 | Serio | 99—306 |
| 3,187,663 | 6/1965 | McLean et al. | 99—306 |

WALTER A. SCHEEL, *Primary Examiner.*

S. P. FISHER, *Assistant Examiner.*

UNITED STATES PATENT OFFICE
CERTIFICATE OF CORRECTION

Patent No. 3,333,964            August 1, 1967

Joseph A. Bender

It is hereby certified that error appears in the above numbered patent requiring correction and that the said Letters Patent should read as corrected below.

Column 1, line 9, for "coffee" read -- brew --; column 3, line 37, for "FGI." read -- FIG. --; column 10, line 11, for "higher level" read -- level higher --.

Signed and sealed this 6th day of August 1968.

(SEAL)
Attest:

Edward M. Fletcher, Jr.            EDWARD J. BRENNER
Attesting Officer               Commissioner of Patents